United States Patent
Kumagae et al.

(10) Patent No.: US 9,097,154 B2
(45) Date of Patent: Aug. 4, 2015

(54) PRODUCTION METHOD OF CERAMIC HONEYCOMB FILTER

(75) Inventors: Toyohide Kumagae, Miyako-gun (JP); Shinya Tokumaru, Miyako-gun (JP); Hirohisa Suwabe, Moka (JP)

(73) Assignee: HITACHI METALS, LTD., Tokyo (JP)

(*) Notice: Subject to any disclaimer, the term of this patent is extended or adjusted under 35 U.S.C. 154(b) by 739 days.

(21) Appl. No.: 12/822,792

(22) Filed: Jun. 24, 2010

(65) Prior Publication Data

US 2010/0272890 A1    Oct. 28, 2010

Related U.S. Application Data

(62) Division of application No. 11/528,586, filed on Sep. 28, 2006.

(51) Int. Cl.
| | |
|---|---|
| B29C 45/14 | (2006.01) |
| F01N 3/022 | (2006.01) |
| C04B 38/00 | (2006.01) |
| B28B 11/00 | (2006.01) |
| B28B 11/18 | (2006.01) |
| C04B 35/195 | (2006.01) |

(52) U.S. Cl.
CPC ............ *F01N 3/0222* (2013.01); *B28B 11/006* (2013.01); *B28B 11/007* (2013.01); *B28B 11/18* (2013.01); *C04B 35/195* (2013.01); *C04B 38/0006* (2013.01); *C04B 38/0012* (2013.01); *Y02T 10/20* (2013.01)

(58) Field of Classification Search
CPC ............ C04B 38/0012; C04B 38/0006; C04B 35/195; B28B 11/006; B28B 11/007; B28B 11/18

USPC ......... 264/259, 630–631, 264, 267, 344, 161, 264/154–156, 138, 162

See application file for complete search history.

(56) References Cited

U.S. PATENT DOCUMENTS

| | | | |
|---|---|---|---|
| 4,041,591 A | 8/1977 | Noll et al. | |
| 4,432,918 A * | 2/1984 | Paisley | 264/43 |
| 6,849,222 B2 | 2/2005 | Yamaguchi et al. | |
| 2003/0093982 A1 * | 5/2003 | Suwabe et al. | 55/523 |
| 2004/0209039 A1 | 10/2004 | Ichikawa | |

FOREIGN PATENT DOCUMENTS

| | | | |
|---|---|---|---|
| JP | 9-29019 | 2/1997 | |
| JP | 2000043024 A * | 2/2000 | ............. B28B 11/18 |
| JP | 2001-300922 | 10/2001 | |
| JP | 2002-028915 | 1/2002 | |
| WO | WO 2005003036 A1 | 4/2005 | |

* cited by examiner

*Primary Examiner* — Yogendra Gupta
*Assistant Examiner* — Ninh Le
(74) *Attorney, Agent, or Firm* — Browdy and Neimark, PLLC

(57) ABSTRACT

A method for producing a ceramic honeycomb filter having predetermined plugs comprising immersing the end portions of a ceramic honeycomb structure having large numbers of flow paths, with its end surface covered with a mask provided with holes only at positions corresponding to the predetermined flow paths, in a plugging material slurry, so that the plugging material slurry is introduced into the end portions of the predetermined flow paths, and removing plugging material protrusions formed in the flow paths that should not be plugged.

5 Claims, 5 Drawing Sheets

PRIOR ART

PRIOR ART

PRODUCTION METHOD OF CERAMIC HONEYCOMB FILTER

CROSS-REFERENCE TO RELATED APPLICATIONS

The present application is a divisional of application Ser. No. 11/528,586, filed Sep. 28, 2006. The content of the above application is incorporated herein by reference.

FIELD OF THE INVENTION

The present invention relates to a method for producing a ceramic honeycomb filter suitable for removing particulate matter from an exhaust gas, etc. discharged from diesel engines.

BACKGROUND OF THE INVENTION

FIGS. 1(a) and 1(b) schematically show one example of ceramic honeycomb filters for capturing particulate matter in exhaust gases from automobiles. The ceramic honeycomb filter 11 comprises a ceramic honeycomb structure 1 having large numbers of flow paths 3, 4 partitioned by porous cell walls 2 extending from an inlet end surface 12 to an outlet end surface 13, and plugs 5, 5 for sealing flow paths 3, 4 alternately in a checkerboard pattern on both end surfaces 12, 13. The porous cell walls 2 have as high porosity as, for instance, 55-80% to avoid pressure loss increase, because they carry catalytic materials for burning particulate matter in the exhaust gas at low temperatures.

As a method for producing a ceramic honeycomb filter having such structure, JP2001-300922A and JP2002-28915A disclose, as shown in FIG. 2, a method comprising the steps of (a) attaching a film 6 to an end surface 12 of a ceramic honeycomb structure 1, (b) providing the film 6 with holes 7 at positions corresponding to flow paths 3, (c) placing the ceramic honeycomb structure 1 in a plugging material slurry 8 containing ceramic particles, an organic binder, water, etc. with the end surface 12 downward, (d) introducing the plugging material slurry 8 into the flow paths 3 through the holes 7 of the film 6 while pressing the ceramic honeycomb structure 1 downward by a pressing means 10, (e) dewatering and hardening the plugging material slurry 8 entering into the flow paths 3, and finally (f) peeling the film 6.

However, because the porous cell walls 2 are, for instance, as thin as 0.1-0.5 mm and have as high porosity as 55-80%, they easily have chipped portions 21 on the end surface 12 as shown in FIG. 3. Also, because there is no sufficient adhesion between the end surfaces 12 of the thin porous cell walls 2 and the film 6, gaps are likely to be generated between the end surfaces 12 and the film 6 by pressing. As a result, the plugging material slurry 8 is likely to leak to adjacent flow paths 4 that should not be plugged at the end surface 12, and stick to their cell walls 2 as protrusions 51 as schematically shown in FIG. 4. The formation of the plugging material protrusions 51 occurs on both sides of the ceramic honeycomb structure 1. With the plugging material protrusions 51 formed, the flow paths 3, 4 are narrowed, resulting in pressure loss increase in the ceramic honeycomb filter 11. In addition, particulate matter in the exhaust gas is accumulated on the plugging material protrusions 51, pressure loss increases in the ceramic honeycomb filter 11 in a short period of time.

JP9-29019A discloses a method for plugging a ceramic honeycomb structure, which comprises (a) covering an end surface of a ceramic honeycomb structure with a film, (b) providing the film with holes at positions corresponding to flow paths that should not be plugged, (c) charging a temporary plugging material slurry comprising powder insoluble in a solvent for a plugging material slurry and burnable or decomposable by heating, into the flow paths through the holes, (d) peeling the film from the end surface after the temporary plugging material slurry is dried, (e) charging the plugging material slurry into the end portions of flow paths to be plugged, and (f) sintering the plugging material slurry while decomposing the resultant temporary plugs. Because the plugging material slurry is charged into the flow paths to be plugged after the temporary plugging material slurry is charged into the flow paths that should not be plugged, the plugging material slurry does not leak to the flow paths that should not be plugged. However, with the temporary plugging material slurry leaking to the flow paths to be plugged, the flow paths to be plugged are insufficiently filled with the plugging material slurry, and the plugs are bonded to the cell walls with insufficient adhesion strength. In addition, this method is not efficient because it needs two slurry-charging steps.

OBJECT OF THE INVENTION

Accordingly, an object of the present invention is to provide a method for producing a ceramic honeycomb filter free from plugging material protrusions in flow paths that should not be plugged, thereby suffering smaller pressure loss.

DISCLOSURE OF THE INVENTION

The method of the present invention for producing a ceramic honeycomb filter having predetermined plugs comprises immersing the end portions of a ceramic honeycomb structure having large numbers of flow paths, with its end surface covered with a mask provided with holes only at positions corresponding to the predetermined flow paths, in a plugging material slurry, so that the plugging material slurry is introduced into the end portions of the predetermined flow paths, and removing plugging material protrusions formed in the flow paths that should not be plugged.

The plugging material protrusions are removed preferably before burning the plugs. The removal of the plugging material protrusions is preferably conducted by (1) removing the end portions of the ceramic honeycomb filter, (2) blowing a high-pressure gas to an end surface of the ceramic honeycomb filter, or (3) moving a protrusions-removing means in a flow path in which the plugging material protrusions are formed. The protrusions-removing means is preferably an elastic member.

The protrusions-removing means is preferably a brush comprising twisted wires, and large numbers of elastic filaments held by the twisted wires.

DESCRIPTION OF THE BEST MODE OF THE INVENTION

[1] Production of Ceramic Honeycomb Filter

Figure 1A:
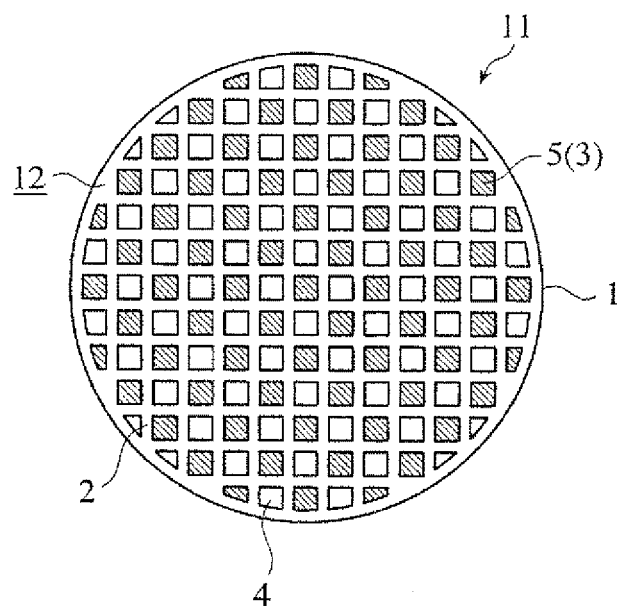
FIG. 1(a) is an end view schematically showing an example of ceramic honeycomb filters.
Figure 1B:
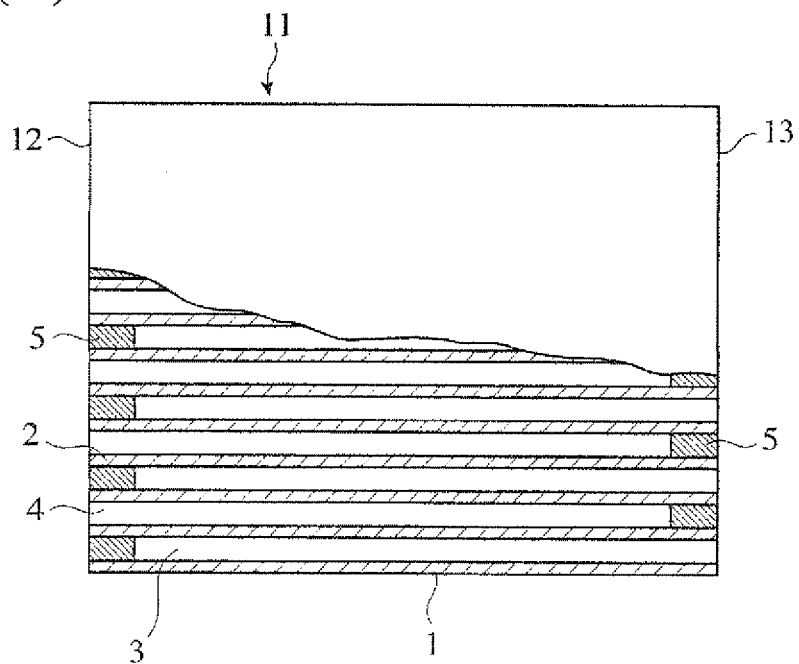
FIG. 1(b) is a schematic view showing the cross section of the ceramic honeycomb filter of FIG. 1(a).
Figure 2:
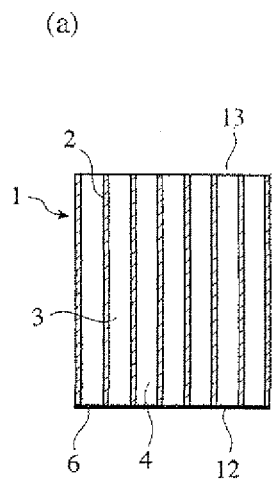
FIGS. 2(a)-2(f) are views schematically showing an example of the production methods of ceramic honeycomb filters.
Figure 2:
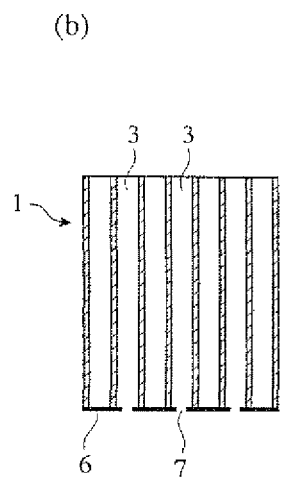
Figure 2:
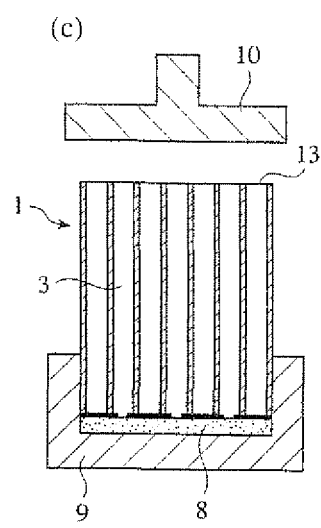
Figure 2:
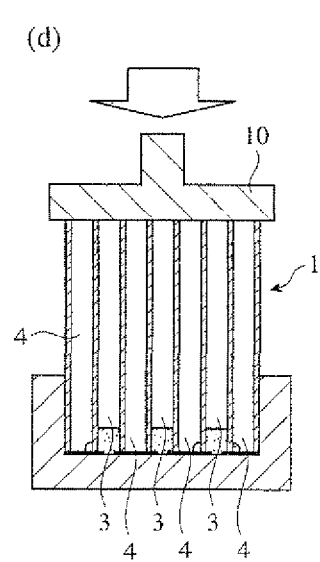
Figure 2:
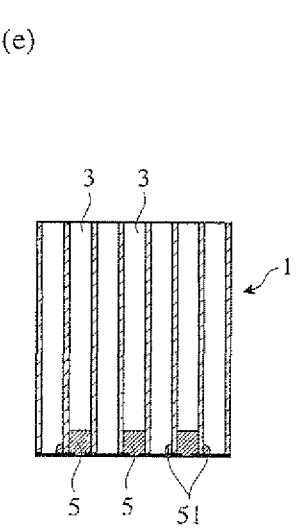
Figure 2:
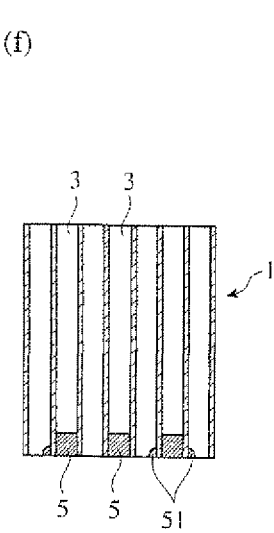
Figure 3:
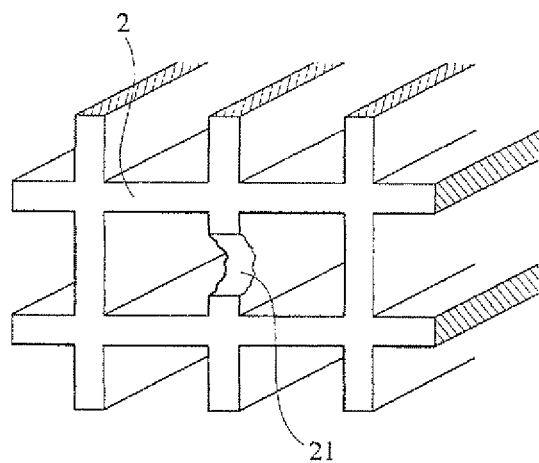
FIG. 3 is a partial perspective view schematically showing a chipped portion in a cell wall in an end portion of the ceramic honeycomb filter.
Figure 4:
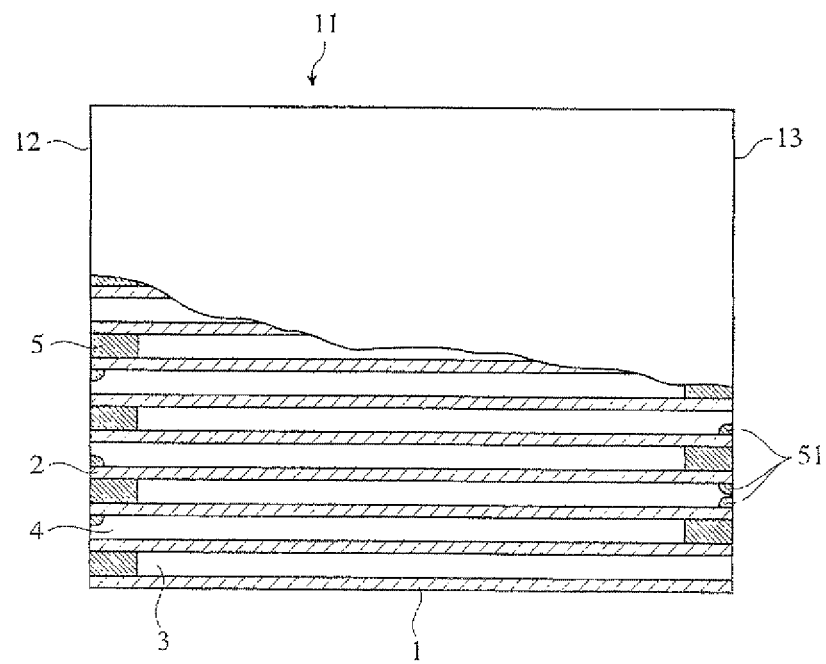
FIG. 4 is a schematic cross-sectional view showing an example of ceramic honeycomb filters produced by conventional methods.

As shown in FIGS. 2 and 5, a plastic moldable material of ceramic powder is extrusion-molded to a green body having a honeycomb structure, and sintered to provide a ceramic honeycomb structure 1 having large numbers of flow paths partitioned by porous cell walls. A resin mask 6 usually in the form of a film is attached to an end surface 12 of the ceramic honeycomb structure 1 [step (a)], and provided with holes 7 by laser, etc. alternately in a checkerboard pattern such that plugs 5 are formed in flow paths 3 to be plugged [step (b)]. The end portion of the ceramic honeycomb structure 1 is immersed in a plugging material slurry 8 [step (c)], and pressed from above by a pressing means 10 to introduce the plugging material slurry 8 into the flow paths 3 through the holes 7 [step (d)]. After removing the mask film 6, plugs are dried [step 2(e)]. Plugs are formed also on the side of the other end surface 13. The plugs 5 are then sintered to provide a plugged ceramic honeycomb filter. Incidentally, the formation of the plugs 5 may be conducted either before or after burning the ceramic honeycomb structure 1.

[2] Method of Removing Plugging Material Protrusions

On either end surface side, the plugging material slurry 8 inevitably leaks to the flow paths that should not be plugged, through gaps between the end surface 12 and the mask film 6 and chipped portions in the cell walls 2, resulting in the formation of plugging material protrusions 51. To remove the plugging material protrusions 51, it is preferable to use (1) a method of removing end portions from the ceramic honeycomb filter 11, (2) a method of blowing a high-pressure gas (for instance, high-pressure air) to the end surface of the ceramic honeycomb filter 11, or (3) a method of moving a protrusions-removing means in the flow paths in which plugging material protrusions 51 are formed.

Figure 5A:
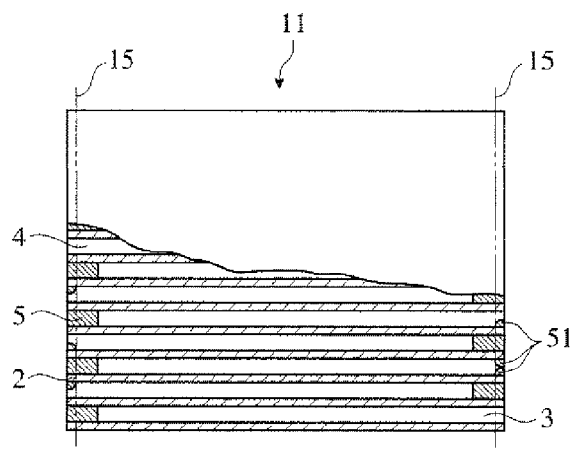
FIG. 5(a) is a schematic cross-sectional view showing a ceramic honeycomb filter produced by the method according to one embodiment of the present invention, at a stage in which end portions are not cut off.
Figure 5B:
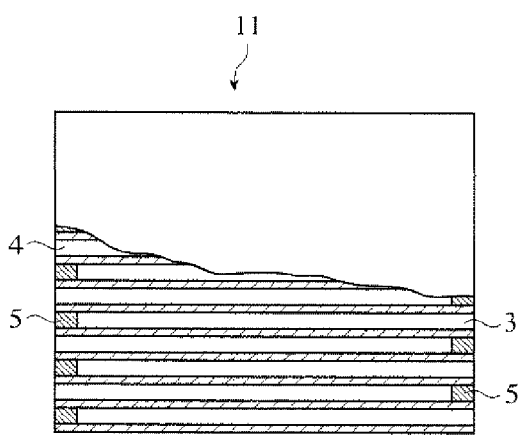
FIG. 5(b) is a schematic cross-sectional view showing the ceramic honeycomb filter of FIG. 5(a), from which end portions are cut off to remove plugging material protrusions.

Utilizing the phenomenon that the plugging material protrusions 51 are formed in the flow paths mainly near the end surface, the method (1) cuts both end portions [regions outside of planes 15, 15 shown in FIG. 5(a)] off from the ceramic honeycomb filter 11 to remove the plugging material protrusions 51 [see FIG. 5(b)].

The method (2) blows a high-pressure gas to an end surface close to or distant from the plugging material protrusions 51.

Figure 6:
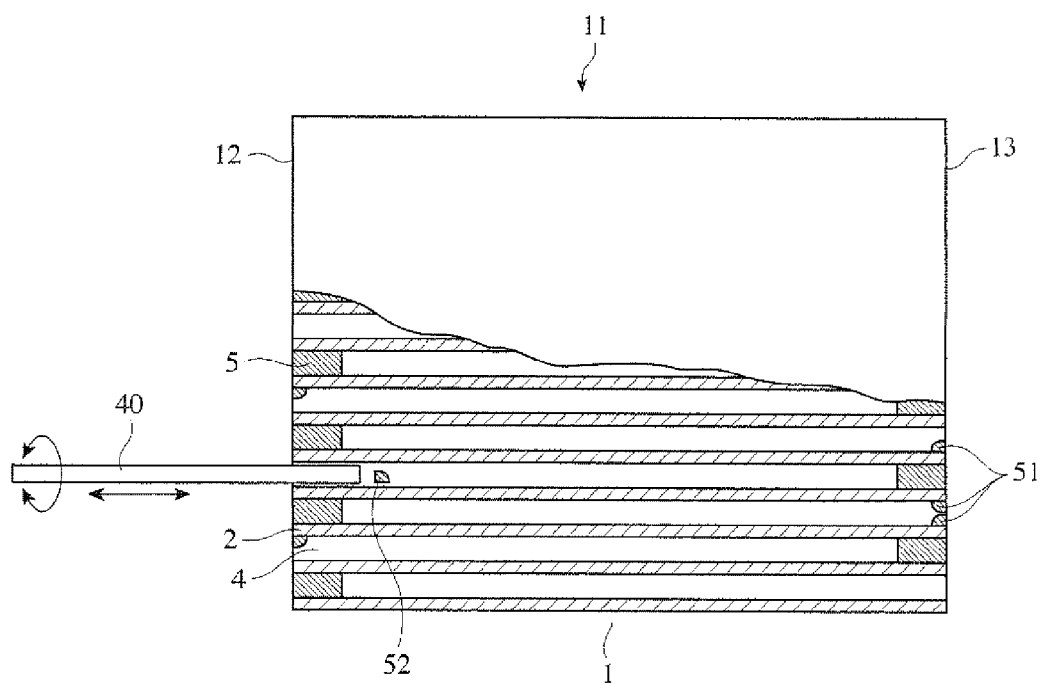
FIG. 6 is a schematic cross-sectional view showing the removal of plugging material protrusions by the method according to another embodiment of the present invention.

The method (3) inserts a protrusions-removing means 40 into an end portion of a flow path. As shown in FIG. 6, when the protrusions-removing means 40 is caused to move in the flow path, the plugging material protrusions 51 coming into contact with the protrusions-removing means 40 are surely detached from the cell walls of the flow path. The detached plugging material protrusions 52 can easily be discharged from the flow paths by directing the opening ends of the flow paths downward, or by air blow, etc. The protrusions-removing means 40 is not restricted, as long as it can be inserted into a flow path, and has such rigidity that the plugging material protrusions 51, with which it comes into contact, are detached from the cell walls. It may be, for instance, a round rod made of metals, resins, ceramics, etc., or a rod having a substantially similar cross section to those of the flow paths. The rod may have grooves on its outer surface. The rod may be elastic.

When the protrusions-removing means 40 is elastic, it can reach corners of flow paths each having, for instance, a tetragonal cross section, so that it can surely remove the plugging material protrusions 51. In addition, the elastic protrusions-removing means 40 does not cause damage to the cell walls 2 when it is brought into contact with them.

Figure 7:
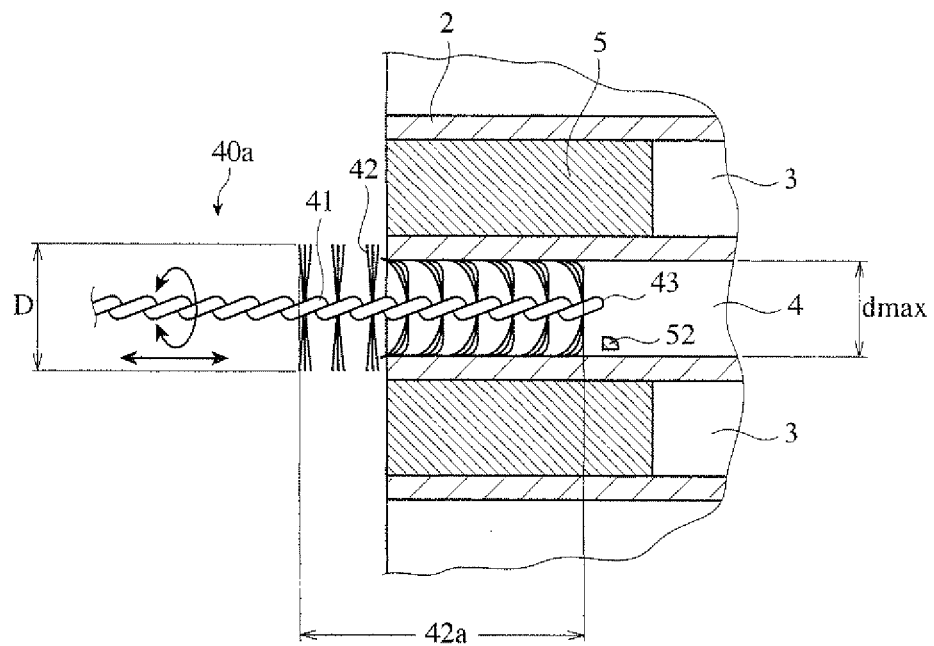
FIG. 7 is a schematic cross-sectional view showing a brush inserted into an end portion of a flow path.

A preferred example of the protrusions-removing means is, as shown in FIG. 7, a brush 40a comprising a pair of twisted wires 41, and large numbers of elastic filaments 42 held by the twisted wires 41. When the brush 40a moves back and forth in a flow path 3, 4, the plugging material protrusions 51 in contact with the elastic filaments 42 are surely detached from the cell walls 2 by the elasticity of the elastic filaments 42. A tip end portion 43 of the twisted wires 41 may first come into contact with the plugging material protrusions 51, and move into the flow path 3, 4 while destroying them. Therefore, even though the flow path 3, 4 is narrowed by the plugging material protrusions 51, the brush 40a can easily be inserted. Further, the elastic filaments 42 can easily reach corners of the flow path 3, 4 having, for instance, a tetragonal cross section, so that the plugging material protrusions 51 can surely be removed without damaging the cell walls 2.

From the aspect of strength, elasticity, elastic-filaments-holding force, etc., the twisted wires 41 are preferably made of metals, particularly stainless steel. To surely remove the plugging material protrusions 51 without damaging the cell walls 2, the elastic filaments 42 are preferably made of plastic resins such as polyamides (nylon 6-10, nylon 6-12, etc.), polybutylene terephthalate, polytrimethylene terephthalate, polyethylene terephthalate, etc. The elastic filaments 42 may be constituted by two or more filaments with different rigidity.

The cross section shapes of the elastic filaments 42 are not particularly restricted as long as they have enough rigidity for removing the plugging material protrusions 51, and may be circular, hexagonal, pentagonal, tetragonal, triangular, etc. To make the insertion of the brush 40a into the flow path 3, 4 easy, the elastic filament assembly 42a may be tapered. Of course, the elastic filament assembly 42a may have a uniform, or regularly or irregularly changing outer diameter.

Figure 8A:
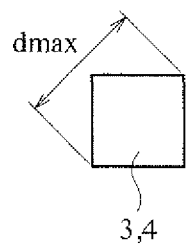
FIG. 8(a) is a view showing an example of the cross section shapes of flow paths in ceramic honeycomb filters.
Figure 8B:
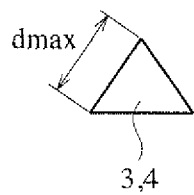
FIG. 8(b) is a view showing another example of the cross section shapes of flow paths in ceramic honeycomb filters.
Figure 8C:
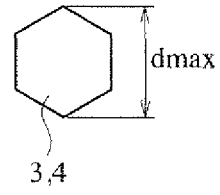
FIG. 8(c) is a view showing a further example of the cross section shapes of flow paths in ceramic honeycomb filters.

As shown in FIG. 7, the diameter D of the elastic filament assembly 42a is preferably larger than the maximum diameter dmax of the flow path 3, 4, so that the elastic filament assembly 42a can reach corners of the flow path 3, 4. For instance, when the flow path 3, 4 has a tetragonal, triangular or hexagonal cross section, the maximum diameter dmax of the flow path 3, 4 is as shown in FIGS. 8(a), 8(b) and 8(c).

The removal of the plugging material protrusions 51 may be conducted either before or after sintering the plugs 5, but it is preferably conducted before burning the plugs 5, because the sintering of the plugs 5 results in the sintered plugging material protrusions 51 having higher adhesion to the cell walls 2. Also, to facilitate access to the plugging material protrusions 51 from the flow path end, the removal of the plugging material protrusions 51 is preferably conducted after peeling the mask film 6.

Though one protrusions-removing means 40 is inserted into the flow paths 3, 4 in the above example, pluralities of protrusions-removing means 40 may be inserted into pluralities of flow paths 3, 4 on a one-to-one basis simultaneously.

The present invention will be explained in more detail with reference to Examples below without intention of restricting the scope of the present invention.

Example 1

Powders comprising kaolin, talc, silica, aluminum hydroxide and alumina were formulated to prepare cordierite-forming powder comprising 47-53% of $SiO_2$ and 32-38% of $Al_2O_3$ by mass. The cordierite-forming powder was fully blended with a methylcellulose binder, a pore-forming agent, and a predetermined amount of water to form a plastic moldable material. The moldable material was extrusion-molded, dried, and sintered at 1400° C., to produce a cordierite ceramic honeycomb structure 1 (outer diameter: 267 mm, length: 314 mm, cell wall pitch: 1.55 mm, cell wall thickness: 0.32 mm, and cell wall porosity: 63%) having large numbers of flow paths with tetragonal cross sections.

As shown in FIG. 2, a resin mask film 6 was attached to an end surface of the ceramic honeycomb structure 1 [step (a)], and provided with holes 7 in a checkerboard pattern by laser [step (b)]. An end portion of the ceramic honeycomb structure 1 on the side of the end surface 12 was immersed in a plugging material slurry 8 of cordierite [step (c)], and the plugging material slurry 8 was introduced into the end portions of the flow paths 3 through the holes 7 until the resultant plugs 5 became as long as about 15 mm, while pressing the ceramic honeycomb structure 1 by a pressing means 10 [step (d)]. After the mask film 6 was removed, the plugs 5 were dried [step (e)] to obtain a plugged ceramic honeycomb structure. The plugging material slurry 8 leaked from some flow paths 3 to adjacent flow paths 4 that should not be plugged, through gaps generated by the peeling of the mask film 6 and chipped portions in the cell walls 2, resulting in the formation of plugging material protrusions 51 in the flow paths 4.

After plugs 5 were similarly formed on the side of the other end surface 13, the plugs 5 on both sides were sintered at 1400° C. to obtain the ceramic honeycomb filter 11 shown in FIG. 5(a). It was confirmed that there were plugging material protrusions 51 formed near each end surface 12, 13. Accordingly, end portions each 5 mm from the end surface 12, 13 were cut off from the filter 11 by a milling cutter to remove substantially all plugging material protrusions 51, thereby obtaining the ceramic honeycomb filter 11 (length: 304 mm, plug length: about 10 mm) having plugs 5 only in the end portions of the flow paths to be plugged as shown in FIG. 5(b).

Example 2

After forming a cordierite ceramic honeycomb structure 1 (outer diameter: 267 mm, length: 304 mm, cell wall pitch: 1.55 mm, cell wall thickness: 0.32 mm, and cell wall porosity: 63%) having large numbers of flow paths 3, 4 with substantially tetragonal cross sections in the same manner as in Example 1, a plugging material slurry 8 was charged into both end portions of the flow paths 3, 4 alternately in a checkerboard pattern, such that the resultant plugs 5 became as long as about 10 mm. The plugs 5 were sintered at 1400° C. to produce the cordierite ceramic honeycomb filter 11 shown in FIG. 5(a). Plugging material protrusions 51 were formed in the flow paths of the filter that should not be plugged near each end surface. As a result of blowing a high-pressure air of 1 MPa to the flow paths 3, 4 on both ends of the filter 11, substantially all plugging material protrusions 51 were removed.

Example 3

After forming a cordierite ceramic honeycomb structure 1 (outer diameter: 267 mm, length: 304 mm, cell wall pitch: 1.55 mm, cell wall thickness: 0.32 mm, and cell wall porosity: 63%) having large numbers of flow paths 3, 4 with substantially tetragonal cross sections in the same manner as in Example 1, plugs 5 of about 10 mm in length were formed in the end portions of the flow paths 3 on one side. There were plugging material protrusions 51 partially formed in the flow paths 4 near the end surface 12. A drill of 1.0 mm in diameter was inserted into a flow path 4 having a plugging material protrusion 51, and moved along the flow path while rotating to remove the plugging material protrusions 51. Plugs 5 of about 10 mm in length were then formed in the other end portions of the flow paths 4, and plugging material protrusions 51 were removed by the drill. The plugs 5 were finally sintered at 1400° C.

Example 4

After forming a cordierite ceramic honeycomb structure 1 (outer diameter: 267 mm, length: 304 mm, cell wall pitch: 1.55 mm, cell wall thickness: 0.32 mm, and cell wall porosity: 63%) having large numbers of flow paths 3, 4 with substantially tetragonal cross sections in the same manner as in Example 3, plugs 5 of about 10 mm in length were formed in the end portions of the flow paths 3 on one side. There were plugging material protrusions 51 partially formed in the flow paths 4 near the end surface 12. A brush 40a comprising large numbers of elastic nylon filaments 42 (diameter: 0.05-0.06 mm, and length: 2.5-2.7 mm) held by twisted wires 41 as shown in FIG. 7 was inserted into a flow path 4 having a plugging material protrusion 51, and moved along the flow path while rotating to remove the plugging material protrusions 51. Detached plugging material protrusions were discharged from the flow paths 4 by air blow. Plugs 5 of about 10 mm in length were also formed in the end portions of the flow paths 3 on the other side, and plugging material protrusions 51 were removed by the brush 40a. The plugs 5 were finally sintered 1400° C.

Examples 5 and 6

Plugging material protrusions 51 were removed in the same manner as in Example 4, except for changing the elastic filaments 42 of the brush 40a to those made of polybutylene terephthalate and polyethylene terephthalate, respectively.

Example 7

A ceramic honeycomb filter 11 was produced in the same manner as in Example 2, except that the plugging material protrusions 51 were removed before burning the plugs 5, and that the pressure of the high-pressure air was changed to 0.3 MPa.

Comparative Example 1

After forming a cordierite ceramic honeycomb structure 1 (outer diameter: 267 mm, length: 304 mm, cell wall pitch:

1.55 mm, cell wall thickness: 0.32 mm, and cell wall porosity: 63%) having large numbers of flow paths 3, 4 with substantially tetragonal cross sections in the same manner as in Example 1, plugs 5 of about 10 mm in length were formed in the end portions of the flow paths 3, 4 on both sides alternately in a checkerboard pattern, and sintered. Plugging material protrusions 51 formed in part of the flow paths 3, 4 were not removed.

The ceramic honeycomb filters 11 of Examples 1-7 and Comparative Example 1 were measured with respect to pressure loss and a particulate-matter-capturing ratio by the following methods. The measurement results are shown in Table 1.

(1) Pressure Loss

Air at a flow rate of 15 $Nm^3$/min was supplied to each ceramic honeycomb filter 11 on a pressure loss test stand to measure pressure at the inlet and outlet of the filter 11, and the pressure difference between them was used as the pressure loss. The pressure loss is expressed by a relative value, assuming that the pressure loss of the ceramic honeycomb filter 11 of Example 1 was 1.

(2) Capturing Ratio

Carbon powder having an average diameter of 0.042 μm was introduced at a rate of 3 g/h into an air stream of 10 $Nm^3$/min, which was supplied to the ceramic honeycomb filter 11 for 2 hours. A carbon-powder-capturing ratio (on a weight basis) was calculated from the amount of the carbon powder added and the amount of the carbon powder captured by the ceramic honeycomb filter 11.

TABLE 1

| No. | Pressure Loss (relative value) | Capturing Ratio (%) |
| --- | --- | --- |
| Example 1 | 1 | 97 |
| Example 2 | 1.02 | 97 |
| Example 3 | 1.05 | 97 |
| Example 4 | 0.98 | 98 |
| Example 5 | 0.99 | 97 |
| Example 6 | 0.98 | 97 |
| Example 7 | 0.92 | 95 |
| Comparative Example 1 | 1.21 | 97 |

The ceramic honeycomb filters 11 of Examples 1 and 2, in which plugging material protrusions 51 were removed from the end portions of the flow paths after sintering the plugs 5, suffered smaller pressure loss than that of Comparative Example 1 having plugging material protrusions 51 remaining in the flow paths that should not be plugged, with as high capturing ratios as 97%. The ceramic honeycomb filters 11 of Examples 3-7, from which plugging material protrusions were removed before burning the plugs 5, suffered extremely smaller pressure loss than the ceramic honeycomb filter 11 of Comparative Example 1, with a capturing ratio of 95% or more, a level causing practically no problems. Particularly the ceramic honeycomb filters 11 of Examples 4-6, in which plugging material protrusions 51 were surely removed even from the corners of flow paths by a brush, suffered smaller pressure loss than that of Example 3, in which plugging material protrusions 51 were removed by a drill. Example 7 exhibited the lowest pressure loss because plugging material protrusions 51 were removed by a high-pressure air before burning the plugs 5, but some of the plugs 5 were removed, resulting in the lowest capturing ratio.

EFFECT OF THE INVENTION

Because the method of the present invention removes plugging material protrusions formed in the flow paths that should not be plugged at the time of forming plugs, not only pressure loss increase, but also premature pressure loss increase due to the accumulation of particulate matter in the plugging material protrusions can be prevented. It is thus possible to produce a ceramic honeycomb filter free from plugging material protrusions, even with cell walls having as high porosity as 55-80%.

What is claimed is:

1. A method for producing a ceramic honeycomb filter having predetermined plugs, said method comprising:
   immersing end portions of a ceramic honeycomb structure having large numbers of flow paths, with its end surface covered with a mask provided with holes only at positions corresponding to the predetermined flow paths, in a plugging material slurry, so that said plugging material slurry is introduced into the end portions of the predetermined flow paths, and
   removing plugging material protrusions formed in the flow paths that should not be plugged, wherein a protrusions-removing means is moved in a flow path in which said plugging material protrusions are formed, to remove said plugging material protrusions.

2. The method for producing a ceramic honeycomb filter according to claim 1, wherein said plugging material protrusions are removed before burning said plugs formed in the flow paths to be plugged.

3. The method for producing a ceramic honeycomb filter according to claim 1, wherein said protrusions-removing means is an elastic member.

4. The method for producing a ceramic honeycomb filter according to claim 3, wherein said protrusions-removing means is a brush comprising twisted wires, and large numbers of elastic filaments held by the twisted wires.

5. A method for producing a ceramic honeycomb filter having predetermined plugs, said method comprising:
   immersing end portions of a ceramic honeycomb structure having large numbers of flow paths, with its end surface covered with a mask provided with holes only at positions corresponding to the predetermined flow paths, in a plugging material slurry, so that said plugging material slurry is introduced into the end portions of the predetermined flow paths,
   leaving other flow paths free of plugging material slurry except for plugging material slurry which has inadvertently entered said other flow paths to form plugging material protrusions,
   removing the ceramic honeycomb structure from the plugging material slurry, and
   removing the plugging material protrusions formed in the other flow paths that should not be plugged, by moving protrusions-removing means in one or more flow paths in which said plugging material protrusions are formed, to remove said plugging material protrusions.

* * * * *